United States Patent [19]

Poisel et al.

[11] Patent Number: 4,944,590
[45] Date of Patent: Jul. 31, 1990

[54] OPTICAL-FIBER GYROSCOPE OF SAGNAC TYPE HAVING A FIBER-OPTIC LOOP AND 3×3 COUPLER

[75] Inventors: Hans Poisel, Dachau; Gerd Trommer, Munich, both of Fed. Rep. of Germany

[73] Assignee: Messerschmitt-Bölkow-Blohm GMBH, Munich, Fed. Rep. of Germany

[21] Appl. No.: 315,720

[22] Filed: Feb. 24, 1989

[30] Foreign Application Priority Data

Feb. 25, 1988 [DE] Fed. Rep. of Germany ....... 3805904

[51] Int. Cl.$^5$ .............................................. G01B 9/02
[52] U.S. Cl. .................... 356/350; 350/96.15
[58] Field of Search ................. 356/350, 345; 350/96.15, 96.17

[56] References Cited

U.S. PATENT DOCUMENTS 4,440,498  4/1984  Sheem .
4,479,715  10/1984  Sheem .
4,653,917  3/1987  Moeller et al. ................ 356/350
4,662,751  5/1987  Goss et al. .

FOREIGN PATENT DOCUMENTS 2804119  8/1979  Fed. Rep. of Germany .

Primary Examiner—Vincent P. McGraw
Assistant Examiner—S. A. Turner
Attorney, Agent, or Firm—Kenyon and Kenyon

[57] ABSTRACT

An optical-fiber gyroscope of the Sagnac type consists of a fiber-optic loop and a 3×3 coupler, composed of three optically coupled fiber-optic guides, whereby a first fiber-optic guide of the 3×3 coupler is coupled to an optical radiation source and the two other fiber-optic guides of the 3×3 coupler are coupled on one end to one end of the fiber-optic loop and, on the other end, to a radiation detecting instrument. The first fiber-optic guide of the 3×3 coupler features a radiation detecting instrument on the end opposite the radiation source, with which interference-related variations in the light source, as well as in the 3×3 coupler, can be detected.

4 Claims, 2 Drawing Sheets

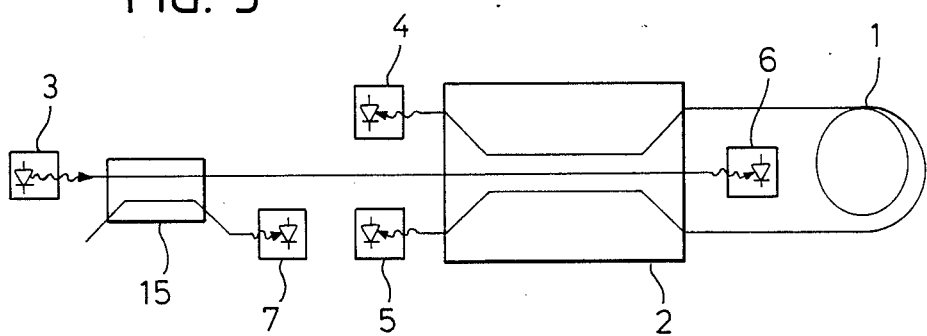
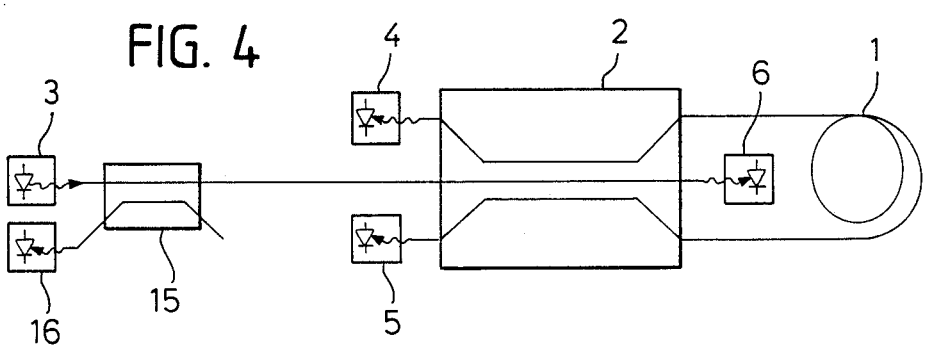
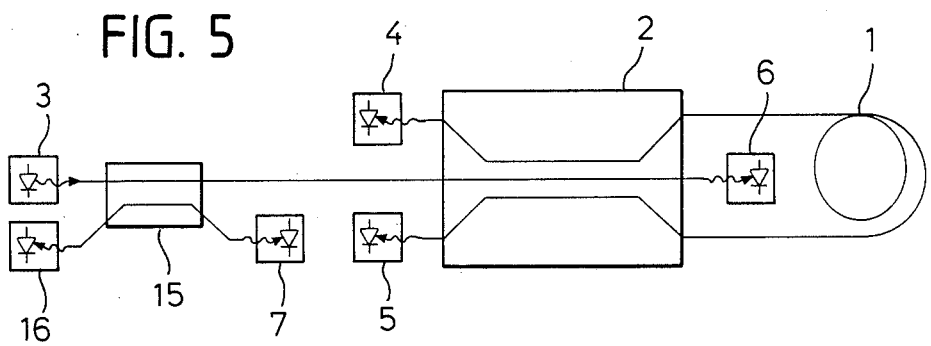

OPTICAL-FIBER GYROSCOPE OF SAGNAC TYPE HAVING A FIBER-OPTIC LOOP AND 3×3 COUPLER

BACKGROUND OF THE INVENTION

The present invention relates to an optical-fiber gyroscope of the Sagnac type with a fiber-optic loop, as well as a 3×3 coupler, comprising three optically coupled fiber-optic guides, whereby a first fiber-optic guide of the 3×3 coupler is coupled to an optical radiation source and the two other fiber-optic guides of the 3×3 coupler are coupled on one end to one end of the fiber-optic loop and, on the other end, to a radiation detecting instrument.

An optical-fiber gyroscope of the above-mentioned type is known from U.S. Pat. No. 4,440,498. One of its remarkable features is its 3×3 coupler, which enables it to run in so-called phase quadrature, whereby the arrangement shows its greatest responsivity at an angle of rotation rate of $\Omega=0$. This is contrary to optical-fiber gyroscopes with standard beam splitters, which were customary in the past. With increased responsivity, however, other negative interference effects become noticeable. As an example, fluctuations in the radiation source or variations inside the 3×3 coupler cannot be distinguished from a signal, which results from rotations of the optical-fiber gyroscope.

SUMMARY OF THE INVENTION

It is, therefore, an object of the present invention to provide an optical-fiber gyroscope of the above-mentioned type, with which interference-related variations in the light source, as well as in the 3×3 coupler, can be detected and eliminated.

The above and other objects of the invention are achieved by an optical-fiber gyroscope of the Sagnac type with a fiber-optic loop, as well as a 3×3 coupler, comprising three optically coupled fiber-optic guides, whereby a first fiber-optic guide of the 3×3 coupler is coupled to an optical radiation source and the two other fiber-optic guides of the 3×3 coupler are coupled on one end to one end of the fiber-optic loop and, on the other end, to a radiation detecting instrument, wherein the first fiber-optic guide of the 3×3 coupler is coupled to a radiation detecting instrument on the end opposite the radiation source.

The invention uses, thereby, a part of the 3×3 coupler, which previously had no significance. In the above-mentioned U.S. Pat. No. 4,440,498, this part was either not provided at all for its own output, or in U.S. Pat. No. 4,479,715, it was deliberately avoided by means of a special shaping of the coupler. By using this previously "useless" output, which is coupled to a radiation detecting instrument, according to the invention, variations in intensity, produced by the light source or the 3×3 coupler, can be determined. This is adequate, then, to compensate for such interferences, especially if one of the two interference sources is predominant.

In addition, the effects of the two interference source can be separated, if another radiation detecting instrument is provided, which detects the intensity of the radiation source, before the radiation passes through the 3×3 coupler. Such radiation detecting instruments are known, for example, in the form of so-called monitoring diodes. These types of radiation detecting instruments can either be directly installed at the radiation source, as is often the case, for example, in semiconductor lasers, or they can be installed by uncoupling the light on the segment between the radiation source and the 3×3 coupler, by using an additional 2×2 coupler.

The interferences caused by the 3×3 coupler are, for the most part, made up of two components, which, on the one hand, are produced by variations in the coupling length and, on the other hand, are caused by variations in the coupling symmetry; both occur mostly as a result of thermal effects. Both of these interference sources can be separated, when the radiation from the 3×3 coupler, counterpropagating in the direction of the radiation source, is also detected.

BRIEF DESCRIPTION OF THE DRAWINGS

The invention will be described in greater detail in the following detailed description with reference to the drawings, in which:

FIG. 2b is a block diagram of the signal analysis of an optical fiber gyroscope according to FIG. 2a;

FIG. 3 shows a device, according to FIG. 2, with indirectly coupled monitoring diodes;

FIG. 4 shows an optical-fiber gyroscope with 3×3 coupler and additional radiation detecting instruments arranged on both sides; and FIG. 5 shows a device, according to FIG. 4, with an additional monitoring diode.

DETAILED DESCRIPTION

Figure 1:
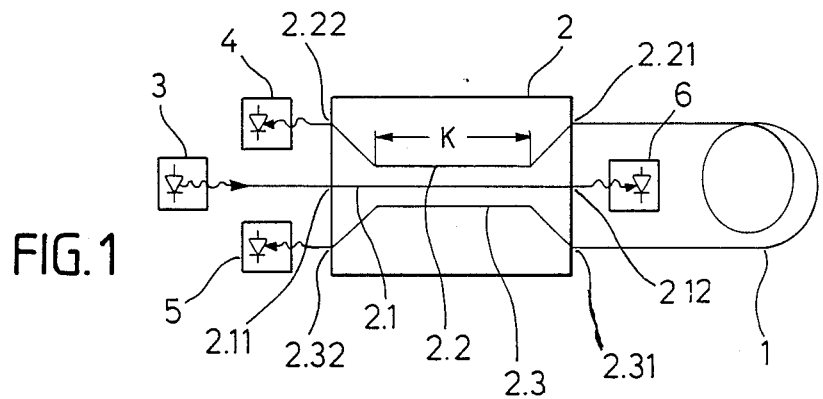
FIG. 1 shows an optical-fiber gyroscope with 3×3 coupler and an additional radiation detecting instrument.

In the exemplified embodiment depicted in FIG. 1, the ends of a fiber-optic loop 1 are coupled to two outputs 2.21 and 2.31 of a 3×3 coupler 2. The input 2.11 of the 3×3 coupler is supplied with optical radiation by a light-emitting diode 3, for example, a laser diode, an edge-emitting diode or a superluminescence diode. The optical radiation is transmitted over the coupling area K to the fiber-optic guides 2.2 and 2.3 and traverses through the outputs 2.21 and 2.31 opposite the fiber-optic loop. The radiation, which propagates again into the 3×3 coupler 2, interferes with itself, whereby the interference signals are received at the outputs 2.22 and 2.32, by means of radiation detecting instruments 4 and 5. The variations in intensity at the outputs 2.22 and 2.32 depend on the rotative speed $\Omega$ acting on the fiber-optic loop 1 and, in the case of a symmetrically designed 3×3 coupler, also symmetrically around the axis $\Omega=0$. A rotation in one direction, consequently causes the intensity to increase at one of the two outputs 2.22 or 2.32 and to decrease at the other one. In this manner, the direction of rotation and the rotative speed can be determined from the signals from the radiation receptors 4 and 5.

An additional radiation detecting instrument 6 is mounted at the end 2.12 of the fiber-optic guide 2.1 opposite the light-emitting diode 3. It receives the remaining radiation from the fiber-optic guide 2.1, which is not coupled over to the fiber-optic loop. This portion of the radiation does not depend on the rotative speed, instead, it is determined exclusively by the original intensity of the radiation from the light-emitting diode 3, as well as by the characteristic of the coupler 2.

Based on the exemplified embodiment depicted in FIG. 2a, as well as the block diagram of FIG. 2b, the signal analysis will be described in greater detail. The optical fiber gyroscope of FIG. 2a corresponds to that of FIG. 1, however, the light-emitting diode 3 is provided with a monitoring diode 7. In this way, interference effects, which are caused by variations in intensity in the light-emitting diodes 3, are detected directly by the monitoring diode 7 and are distinguished from those produced by the 3×3 coupler 2. By subtracting the signals of the monitoring diode 7 from those of the radiation detecting instrument 6, the interferences caused by the 3×3 coupler 2 are obtained.

Figure 2A:
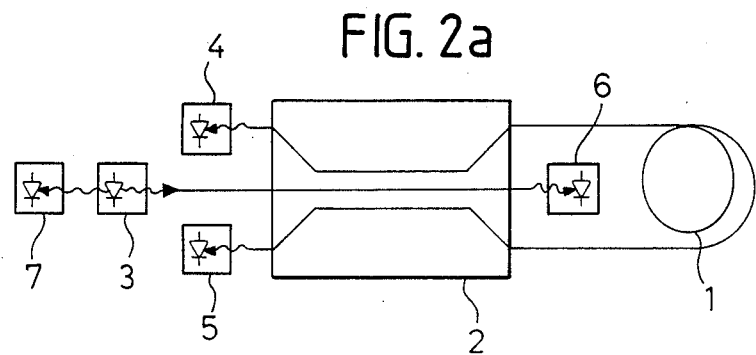
FIG. 2a shows an optical-fiber gyroscope with 3×3 coupler and an additional radiation detecting instrument as well as a monitoring diode.
Figure 2B:
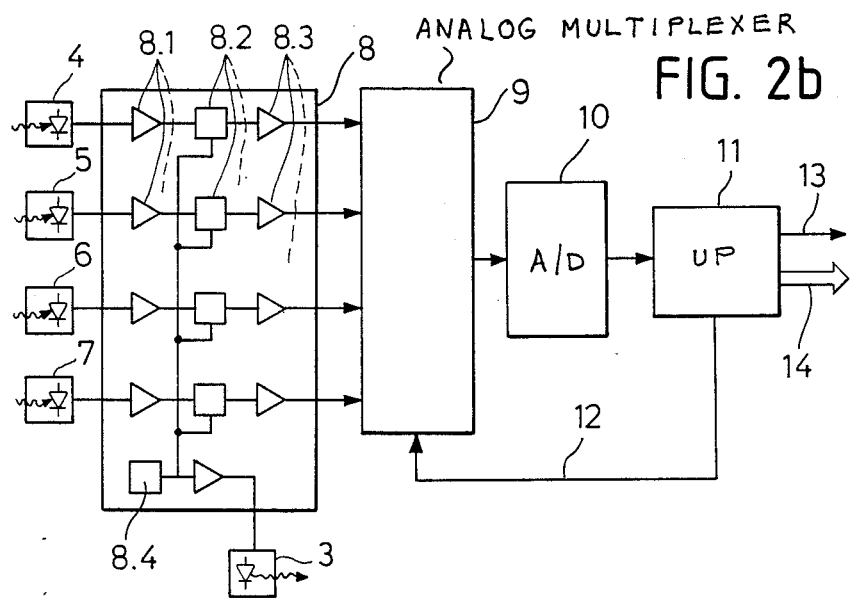

The signal analysis of an arrangement according to FIG. 2a is accomplished with electronics, as depicted in FIG. 2b, whereby the radiation detecting instruments 4, 5, 6 and 7 are coupled to a lock-in amplifier 8. There, the individual signals are amplified over preamplifiers 8.1 and are demodulated, in correct phase relation, by the demodulators 8.2. The oscillator 8.4 provides the reference frequency for modulating the light source 3 and for the demodulators 8.2. The signals of the demodulators, which are filtered with a low-pass filter, are amplified in the amplifiers 8.3 to an appropriate voltage level and adapted to the impedance of the following analog multiplexer 9. The analog multiplexer multiplexes the four output signals in the time interval controlled by the clock frequency 12 of a microprocessor 11. The time-division multiplex signals are converted in an analog-digital converter 10 to digital signals, which are processed by the microprocessor 11. The microprocessor's algorithm calculates the Sagnac phase $\phi_s$ from the interference signals $S_4$ and $S_5$ of the photodiodes 4 and 5, according to the correlation $$S_i = A_i + B_i \cos(\phi_s + C_i) \quad i = 4,5$$

The dependency of the coefficients $A_i$, $B_i$, $C_i$ on the light output from the transmitter 3 and the coupling characteristics of the 3×3 coupler and, thereby, on the signals from the monitoring diodes 6 and 7 are stored in a memory of the microprocessor (for example EPROM). With the help of the above notation, the Sagnac phase or the sensor's rate of rotation, derived therefrom, are calculated by the microprocessor and output through a serial 13 or parallel 14 output, optionally with additional information concerning the fiber-optic guides and condition of the coupler.

In the exemplified embodiment depicted in FIG. 3, the monitoring diode 7 is coupled over a 2×2 coupler to the optical fiber, which connects the light-emitting diode 3 and the 3×3 coupler. Incidentally, this arrangement corresponds to the optical-fiber gyroscope of FIG. 1.

The optical-fiber gyroscope shown in FIG. 4 corresponds to the one in FIG. 3, with the difference that a radiation detecting instrument 16 is mounted on the 2×2 coupler 15 in a way such that the radiation from the 3×3 coupler 2, counterpropagating in the direction of the light source 3, is decoupled and detected. In combination with the signals from the radiation detecting instrument 6, interferences can be separated, based on variations in the coupling length and the coupling symmetry of the 3×3 coupler.

The exemplified embodiment of FIG. 5 corresponds to a combination of the exemplified embodiments of FIGS. 3 and 4. This means that a monitoring diode 7, which receives a signal corresponding to the intensity of the light source 3, as well as a radiation detecting instrument 16, which receives radiation dispersed back from the 3×3 coupler 2, are situated at the outputs of the 2×2 coupler 15. With this arrangement, all of the interference effects of the light source 3 and the 3×3 coupler 2 can be detected and allowed for in the processing of the signals.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An optical-fiber gyroscope of the Sagnac type having a fiber-optic loop, and a 3×3 coupler comprising three optically coupled fiber-optic guides, the fiber optic guides each having a first end and a second end, a first of said fiber-optic guides of the 3×3 coupler being coupled at the first end to an optical radiation source and the two other fiber-optic guides of the 3×3 coupler being coupled on respective ones of the second ends to ends of the fiber-optic loop and, on the first ends, each to a radiation detecting instrument, the first fiber-optic guide of the 3×3 coupler being coupled to a radiation detecting instrument on the second end opposite the radiation source.

2. The optical-fiber gyroscope recited in claim 1, wherein the radiation source is indirectly coupled to at least one additional radiation detecting instrument.

3. The optical-fiber gyroscope recited in claim 2, wherein the additional radiation detecting instrument is coupled to the first fiber-optic guide by at least one 2×2 coupler disposed between the radiation source and the 3×3 coupler.

4. The optical-fiber gyroscope recited in claim 1, wherein the radiation source is directly coupled to at least one additional radiation detecting instrument.

* * * * *